United States Patent
Gillespie et al.

[11] Patent Number: 6,126,779
[45] Date of Patent: Oct. 3, 2000

[54] PLASMA GAS PROCESSING

[75] Inventors: Robert Frew Gillespie, Abingdon; Stephen Ivor Hall, Oxford; David Raybone, Stow-on-the-Wold; Fiona Winterbottom, Oxford, all of United Kingdom

[73] Assignee: AEA Technology PLC, Didcot, United Kingdom

[21] Appl. No.: 08/966,215

[22] Filed: Nov. 7, 1997

[30] Foreign Application Priority Data

Nov. 28, 1996 [GB] United Kingdom ............... 96 24719
Apr. 9, 1997 [GB] United Kingdom ............... 97 07205

[51] Int. Cl.$^7$ .................. C23F 1/02; C23C 16/00; H05H 1/30
[52] U.S. Cl. ............ 156/348; 118/723 E; 118/723 MW; 438/726; 438/729; 427/575; 216/69; 216/71; 422/186.29
[58] Field of Search .................. 118/723 MW, 118/723 ME, 723 E, 723 ER; 156/345; 204/298.06, 298.34, 298.38; 315/111.21; 422/186, 186.04, 186.21, 186.22, 186.29, 906, 907; 438/726, 729, 771, 772, 788, 792; 427/569, 575; 216/69, 71; 134/1.1

[56] References Cited

U.S. PATENT DOCUMENTS

| | | | |
|---|---|---|---|
| 3,954,954 | 5/1976 | Davis et al. | 423/492 |
| 4,876,983 | 10/1989 | Fukuda et al. | 118/722 |
| 5,418,430 | 5/1995 | Bayliss | 315/111.21 |
| 5,503,807 | 4/1996 | Griffiths et al. | 422/186.04 |

FOREIGN PATENT DOCUMENTS

| | | | |
|---|---|---|---|
| 0157758 | 10/1985 | European Pat. Off. | C10J 3/46 |
| 2620436 | 3/1989 | France | C01B 17/027 |
| 2666518 | 3/1992 | France | B01D 53/32 |
| 1088924 | 6/1965 | United Kingdom | C01G 23/04 |
| 1351426 | 5/1974 | United Kingdom | H05B 9/00 |
| 2273027 | 6/1994 | United Kingdom | H05H 1/34 |
| WO 95/26121 | 9/1995 | WIPO | H05H 1/24 |

*Primary Examiner*—Benjamin L. Utech
*Assistant Examiner*—Luz Alejandro
*Attorney, Agent, or Firm*—William H. Holt

[57] ABSTRACT

A plasma enhanced gas reactor including a reaction chamber having a pair of field-enhancing electrodes each of which has an axial passage through it by one of which a reactant gas is admitted to the reaction chamber, and by the other of which reaction products are removed from the reaction chamber.

26 Claims, 5 Drawing Sheets

PLASMA GAS PROCESSING

The present invention relates to the use of a plasma to facilitate a reaction between gaseous substances.

The use of plasmas for the processing of materials or facilitating reactions between gaseous substances is becoming an established technique and a number of forms of apparatus have been devised for these purposes. For example, our earlier patent application 2 282 738 A discloses the use of an elongated cylindrical chamber having an inner rod electrode with helical radial projections thereon and an outer helical electrode, a silent discharge being established between the two electrodes. A gaseous mixture to be processed is passed through the silent discharge in the chamber. Also, our patent GB 2 273 027 discloses a microwave plasma generator comprising a chamber, means for establishing a microwave field in the chamber, a pair of conical field-enhancing electrodes in the chamber, means for admitting a gaseous medium to be excited to the plasma state, and an axial hole in one of the electrodes through which the excited gaseous medium can be withdrawn from the chamber.

It is an object of the present invention to provide an improved plasma enhanced gas reactor.

According to the invention there is provided a plasma enhanced gas reactor, comprising a reaction chamber, means for coupling microwave radiation into the reaction chamber for generating a plasma therein, a field-enhancing electrode comprising opposed metal assemblies positioned with a gap therebetween, the gap defining a region in which microwave energy is concentrated and plasma formation localized, each of the metal assemblies having a passage formed in it and communicating with the gap, the passage in one metal assembly constituting an inlet for a flow of a first reactant gas, means for admitting a flow of a second reactant gas to intercept with the flow of the first reactant gas in the region defined by the gap, and the axial passage in the other metal assembly constituting an outlet for reaction product.

According to the invention in another aspect, there is provided a method for plasma enhanced reacting of two or more gases, which method comprises forming a localized plasma by means of microwaves concentrated in a reactor chamber by a field enhancing electrode comprising opposed metal assemblies positioned with a gap therebetween, the gap defining a region in which the microwave energy is concentrated so as to localize the plasma therein, at least one of the gases being passed through a passage formed in one of the opposed metal assemblies and communicating with the gap, feeding the other gas or gases into the gap, and extracting effluent gas containing reaction product out through a passage formed in the other of the metal assemblies and communicating with the gap.

The invention will now be described, by way of example, with reference to the accompanying drawings, in which FIG. 1 is a section of a reaction chamber embodying the invention, and FIGS. 2a–2e show the plasma configurations produced by five different arrangements of electrode tips used in the embodiment of FIG. 1.

Figure 1:
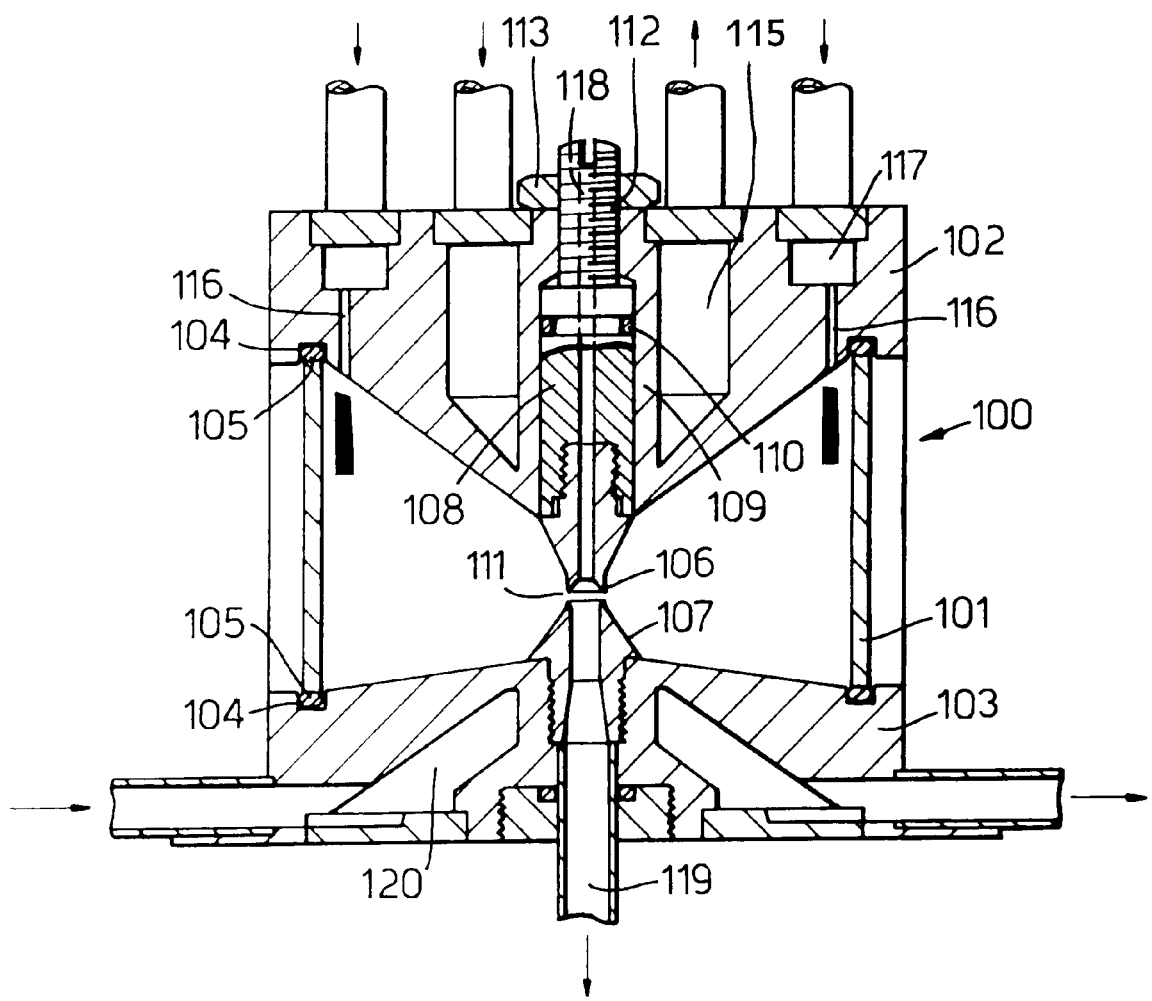

Referring to FIG. 1 of the drawings, a plasma reaction chamber 100 consists of a cylinder 101 which is made of an insulating material such as borosilicate glass or quartz and two end-pieces 102 and 103, respectively. The cylinder 101 fits into annular grooves 104 which are machined in the end-pieces 102 and 103. The cylinder 101 and end-pieces 102 and 103 are sealed by means of O-ring seals 105. The assembly is held together by clamps, which are not shown in the figure. The end-pieces 102 and 103 are conical in form with the end-piece 102 cone angle smaller than that of the end-piece 103. Screwed into the end pieces 102 and 103 are replaceable electrode tips 106 and 107, respectively. The electrode tips 106 and 107 have smaller cone angles than the respective end-pieces 102 and 103 into which they are screwed. Again the electrode tip 106 has a smaller cone angle than that of the electrode tip 107. The electrode tip 106 is not screwed directly into the end-piece 102, but is screwed into a cylindrical block 108 which is a sliding fit in a bore 109 in the end-piece 102. The block 108 and bore 109 are rendered gas-tight by means of an O-ring seal 110. The position of the block 108 in the bore 109 in the end-piece 102, and hence the gap 111 between the electrode tips 106 and 107, can be adjusted by means of a screw 112 and nut 113. The electrode tips 106 and 107 each terminate in a sharp annular edge. The end-piece 102 has a cooling passage 115 formed in it and a number of entry ducts 116 to enable a first reactant gas to be admitted to the reaction chamber 100. The entry ducts 116 are fed from a plenum chamber 117 and are so shaped and disposed that the gaseous medium enters the reaction chamber 100 with a swirling motion. The end-piece 102, block 108 and electrode tip 106 all have an axial passage in them, by means of which a second reactant gas can be admitted to the chamber 100. The end-piece 103 and electrode tip 107 also have an axial passage 119 formed in them, by means of which reaction products can be extracted from the reaction chamber 100. The end-piece 103 has a coolant passage 120 formed in it.

The end-pieces 102 and 103 are made of stainless steel. The tips 106 and 107 can be made of the same material or of a more corrosion and heat resistant metal such as tungsten.

Means (not shown) are provided for coupling microwave radiation into the reaction chamber 100 from a source, which also is not shown. The tips 106 and 107 of the end-pieces 102 and 103, and in particular their sharp terminations, act as a pair of field-enhancing electrodes which concentrate the microwave energy in the region of the gap 111 between the tips 106 and 107 of the electrodes so that, in use, a plasma is formed in that region of the reaction chamber 100 only.

Figure 2A:
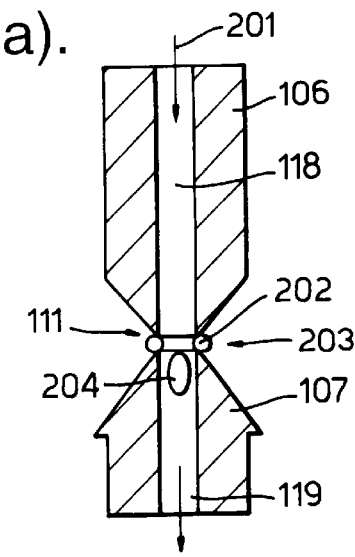

FIG. 2(a) illustrates the action of the reaction chamber as described above, FIGS. 2(b) and 2(c) illustrate the action of the reaction chamber with different electrode configurations and flow conditions for the two reactant gases.

Referring to FIG. 2(a), both the axial passages 118 and 119 are of the same diameter and the gap 111 between the electrode tips is about 2 mm. A main reactant gas 201 is fed to the inlet of the passage 118 in the end-piece 102 assembly. An annular plasma 202 forms in the gap 111 between the electrodes 121. A second reactant gas 203, supplied to the reaction chamber 100 via the duct 116 is drawn into the exit passageway 119 in the tip 106 of the end-piece 103 assembly by the venturi effect of the main gas flow across the gap 111 between the electrode-tips 106 and 107 assisted by the swirling flow of the second reactant gas 203. As a result the second reactant gas 203 passes through the plasma, facilitating the transfer of energy to it. The two gases then react in a zone 204 at the entrance to the passageway 119 in the electrode tip 106 of the end-piece assembly 103.

By way of example, if the first reactant gas is a gas contaminated with a relatively small proportion, for example (0.1 to 1%), of $NO_x$, which it is desired to remove by reduction with NH containing radicals, the first reactant gas is passed through the passageway 118, and, although some of it will be excited in the plasma, most of it will bypass the plasma. All of the flow of the precursor for the generation of the NH containing radicals ($NH_3$), on the other hand, passes through the plasma and will be excited, both thermally and electronically, in so doing.

Similar considerations apply if the main gas contains carbonaceous pollutants which it is desired to remove by oxidation reactions with O containing radicals. In this case, the second reactant gas can be air or oxygen.

Figure 2B:
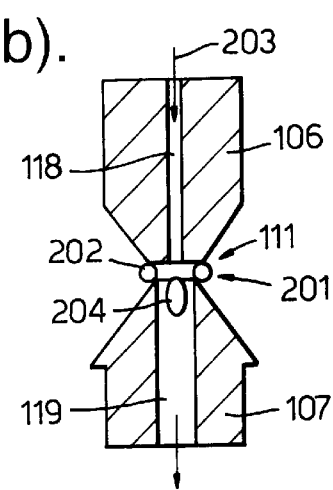

FIG. 2(b) illustrates a different electrode configuration and gas flow pattern. In this case, the passage 118 in electrode tip 106 of the end piece assembly 102 is smaller in diameter than the passageway 119 in the electrode tip 106 of the end-piece assembly 103. The ratio of the diameters of the passages 118 and 119 is dictated by the desired proportions of the two reactant gases. The main gas feed 201 is via the entry ducts 116 to the reaction chamber 100, and the second reactant gas 203 is fed to the passage 118 in the end-piece 102 assembly.

Unlike the previous arrangement, the tip 106 of the end-piece assembly 102 is flat, or even slightly hollowed, to facilitate the entry of the main reactant gas 203 into the gap 111 between the electrode tips 106 and 107. Again, an annular plasma 202 is formed with a reaction zone at the entrance to the passage 119 in the electrode tip 107 of the end-piece assembly 103, but in this case, it is the main reactant gas which passes through the plasma and is energized. Thus, this arrangement requires a higher microwave power input than does the previous arrangement.

Figure 2C:
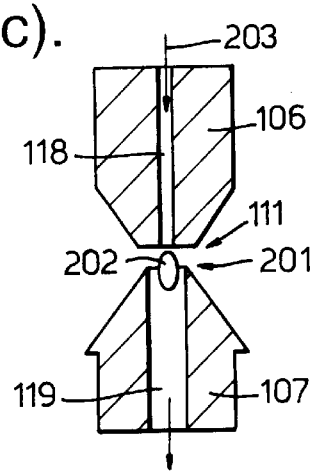

FIG. 2(c) shows the same electrode configuration and gas flow pattern as does FIG. 2(b), but in this case, the gap 111 between the electrode tips 106 and 107 is increased to about 5 mm. As a result, a ball of plasma is formed in the gap 111 between the electrode tips 106 and 107 and both reactant gases are energized simultaneously, and the microwave power requirements are increased further.

Figure 2D:
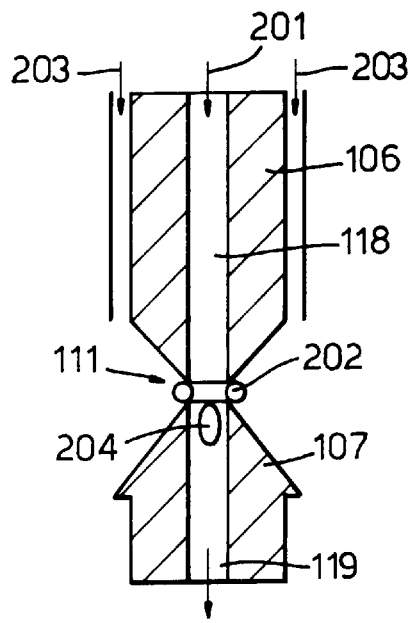

FIG. 2(d) shows the same electrode configuration as FIG. 2(a) but the upper electrode 106 is surrounded by a shroud through which at least a proportion of the second reagent gas, 203 is fed. This arrangement also can be used with the electrode configurations of FIGS. 2(b) and 2(c).

Figure 2E:
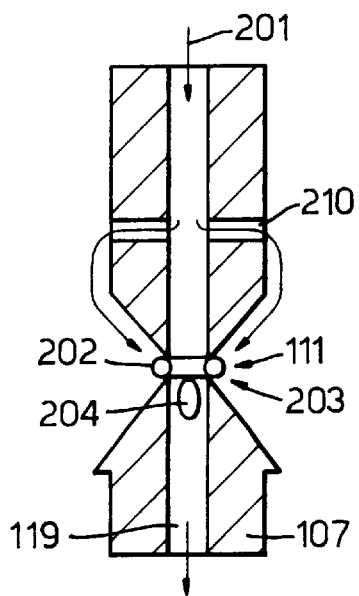

FIG. 2(e) shows the same electrode configuration as FIG. 2(a) but the upper electrode 106 has a number of regularly spaced radial holes 210 immediately upstream of the gap 111 between the electrodes 106 and 107. The venturi effect in the region of the gap 111 between the electrodes 106 and 107 causes a proportion of the first reactant gas 201 to be drawn through the holes 210 and mixed with the second reagent gas 203 prior to its passage through the plasma zone 202.

As before, the configurations of FIGS. 2(b) to 2(e) can be used for gas purification by either reduction or oxidation reactions.

Using the electrode configuration of FIG. 2(a) it is possible to arrange for the second reactant gas to be injected into the main gas flow immediately upstream of the gap 111 between the electrodes 121, rather than rely on the venturi effect drawing the second reactant gas into the main gas flow. However, in this case, the advantage of passing the second gas flow actually through the plasma is lost.

If desired, the effluent from the reaction chamber 100 can be passed through a second reactor containing, for example, a catalytic device for removing from the main gas pollutants other than those removed by the action of the plasma, or the end products of the reactions between the two gases in the reaction chamber 100.

Other benefits which arise from such a combination of plasma generator and catalytic device are:

a) free radicals existing in the effluent leaving the reaction chamber 100 and impinging on the catalyst material in the catalytic device can enhance the performance of the catalyst, and b) The thermal energy of the effluent from the reaction chamber 100 raises the temperature of the catalyst in the catalytic device, again enhancing its performance.

The invention has been described in the context of the purification of gases. However, it is not limited to this application but can be used for other forms of plasma assisted reactions between gaseous media, or even aerosols.

In order to increase the throughput of a plasma gas processing apparatus incorporating the invention a number of reactor chambers can be arranged to operate in parallel. Such an arrangement has the advantage that the failure of a single, or even more than one, reactor chamber does not render the entire apparatus ineffective.

Figure 3:
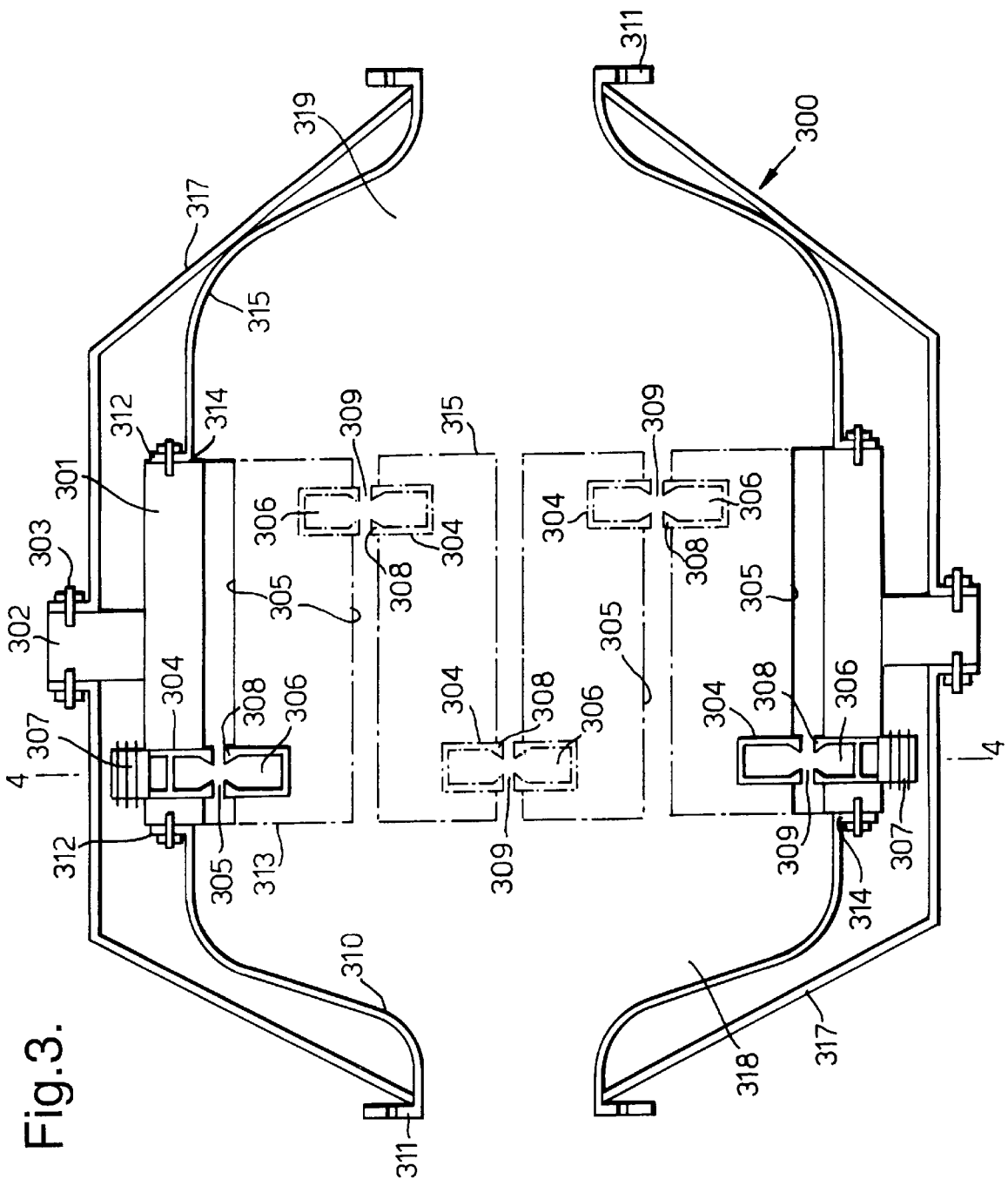
FIG. 3 is a longitudinal section of a schematic plasma gas processing apparatus including a number of gas reactor units embodying the invention.

Referring to FIG. 3, a modular plasma processing apparatus 300 consists of a cylindrical mounting 301 made of stainless steel which has a central flange 302 in which there is a ring of studs 303. In the mounting 301 are two radial arrays of housings 304 and axial passages 305 which extend through the mounting 301. Inserted into each housing 304 is a plasma reaction chamber 306 each of which has a magnetron 307 coupled directly to it. The magnetrons 307 are individually connected to a power supply unit, which is not shown in the drawing.

Figure 4:
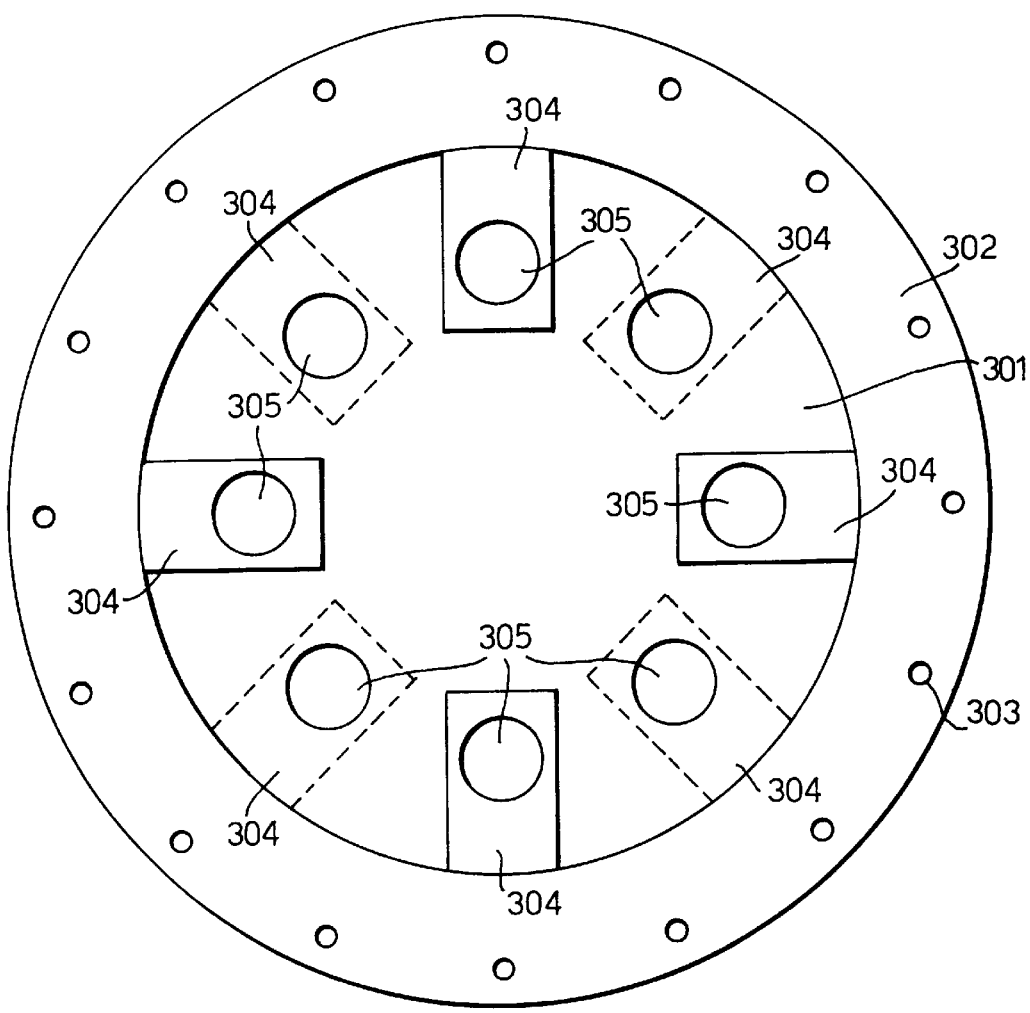
FIG. 4 is a cross-sectional view of a component of the apparatus shown in FIG. 3.

The two arrays of housings 304 are staggered, as shown in FIG. 4. Inside each plasma reaction chamber 306 there is a pair of conical field-enhancing electrodes 308 each of which has an axial hole 309 in it. Thus there is a continuous passage for a gaseous medium to be processed from one side of the apparatus to the other. A first section 310 of flared ducting has a standard industrial coupling flange 311 at one end and a flange 312 at the other, by means of which it is fastened to one plane surface 313 of the housing 301, the joint being sealed by an O-ring seal 314. A similar section 315 of flared ducting is attached to the other plane surface 316 of the housing 301. Components which correspond with similar components of the section of ducting 310 have the same reference numerals. An outer safety shroud 317 is attached to the flange 302 on the housing 304. As shown in the figure, the section of ducting 300 forms an inlet plenum 318 and the section of ducting 315 forms an outlet plenum 319.

The electrodes which are situated in the plasma reaction chambers 306 are provided with passages through which a cooling medium can be circulated. For convenience, neither these nor the associated pipework are shown. Also, in the apparatus described a total of eight plasma reaction chambers 306 are shown. However, if desired, many more can be included.

Figure 5:
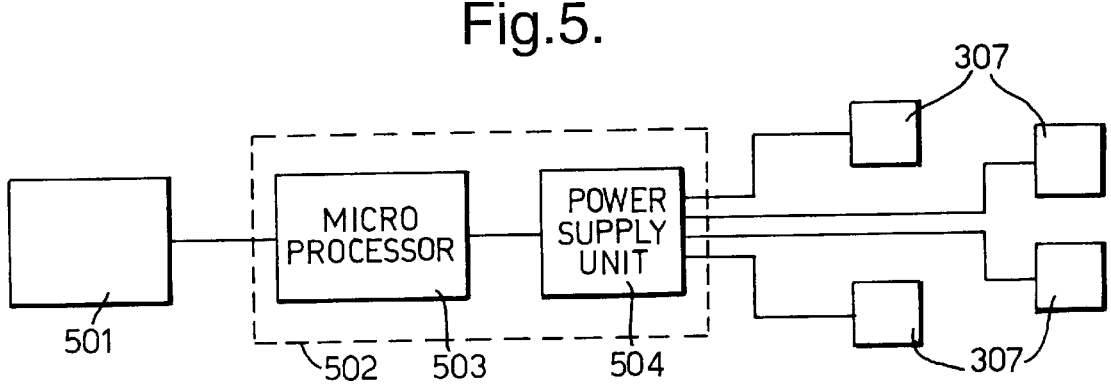
FIG. 5 is a schematic diagram of a system for controlling the apparatus of FIG. 3.

Referring to FIG. 5, one of the plasma reaction chambers 306 is adapted to act as a sensor 501 for a control system 502, as shown in our co-pending application GB 96/10841.4 which is arranged to control the action of the remaining plasma reaction chambers 306. Optical data gathered from the sensor 501 is analysed in a microprocessor 503 to determine the presence and partial pressures of specified components of the gaseous medium passing into the plasma processing apparatus.

The microprocessor 503 also is arranged to generate control signals which are applied to the power supply unit 504 which is connected to the magnetrons 307 of each plasma reaction chamber 306 (four of which are shown in the figure). The power supply unit 504 can be arranged either to vary the power supplied to all the magnetrons 307 as a function of the partial pressures of the specified components of the gaseous medium, or to vary the number of magnetrons 307 which are operational, again as a function of the partial pressure of the specified components of the gaseous medium. In the case where an inlet plenum chamber is used, the first system is preferred. In the case where separate inlet pipes to each plasma chamber 306 are used, the second system can be adopted. In this case, electrically operated inlet valves can be used so that the number of plasma reaction chambers 105 in circuit can be matched to the amount of gaseous medium to be processed.

Alternatively, and particularly if the apparatus is to be used for the removal of a noxious component from a gaseous medium, a gas analyser can be positioned downstream of the plasma reactor chambers 105.

There may be included means for supplying a reagent gas adapted to enhance the action of the plasma, either to the inlet plenum chamber into each of the plasma reaction chambers 306 separately.

The reagent gas may be such as to enhance the formation of active species in the gaseous medium, or to facilitate oxidation or reduction reactions in the gaseous medium, as is known in the plasma processing art.

There may be included also, means for extracting some of the effluent from the apparatus and injecting it into the inlet to the apparatus.

We claim:

1. A plasma enhanced gas reactor comprising a reaction chamber, means for coupling microwave radiation into the reaction chamber for generating a plasma therein, a field-enhancing electrode comprising opposed metal assemblies positioned with a gap therebetween, said gap defining a region in which microwave energy is concentrated and plasma formation localized, each of said metal assemblies having a passage formed in it and communicating with said gap, the passage in one metal assembly constituting an inlet for a flow of a first reactant gas, means for admitting a flow of a second reactant gas to intercept with said flow of the first reactant gas in said region defined by the gap, and the axial passage in the other metal assembly constituting an outlet for reaction product.

2. A reactor according to claim 1, wherein the said metal assemblies are conical in form arranged to taper towards said gap.

3. A reactor according to claim 2, wherein the passage in each conical assembly is axial.

4. A reactor according to claim 3 wherein the axial passage in one conical assembly of the electrode has a diameter which is smaller than the diameter of the axial passage of the other conical assembly.

5. A reactor according to claim 4 wherein said smaller diameter axial passage is shaped to form a concave end to said conical assembly.

6. A reactor according to claim 3 wherein the axial passages formed in the electrode conical assemblies have substantially equal diameters and the electrode conical assembly having the inlet passage for the reactant gas is provided with a series of regularly spaced radial passages by means of which a proportion of the first reactant gas can be extracted and mixed in the second reactant gas prior to being subjected to the plasma.

7. A reactor according to claim 3 wherein the axial passages formed in the conical assemblies have substantially equal diameters and the electrode conical assembly having the inlet passage for the reactant gas is provided with at least one radial passage by means of which the second reactant gas can be mixed with the first reactant gas immediately prior to being subjected to the plasma.

8. A reactor according to claim 1 including a shroud surrounding the assembly having the inlet passage for the reactant gas, there being an annular space between said shroud and said electrode, and means for passing the second reactant gas through said annular space.

9. A reactor according to claim 1 assembled together with one or more such reactors to form a modular plasma processing apparatus, means arranged to feed simultaneously a gaseous medium to be processed to the plasma reaction chamber of each such reactor, means for generating separately plasma in each said plasma reaction chamber, and outlet means for removing the processed gaseous medium from the plasma reaction chambers.

10. A reactor assembly according to claim 9 wherein the means for generating separately the plasma in the plasma reaction chambers comprises microwave generators each respectively coupled directly to an associated plasma reaction chamber.

11. A reactor assembly according to claim 10 wherein means are provided for controlling action of the microwave generators.

12. A reactor assembly according to claim 11 wherein the means for controlling the action of the microwave generators comprises means for determining partial pressure of a component of the gaseous medium and means for varying power supplied to the microwave generators as a function of said partial pressure of the component of the gaseous medium.

13. A reactor assembly according to claim 12 wherein the means for varying the power supplied to the microwave generators is adapted to vary equally the power supplied to each of the microwave power generators.

14. A reactor assembly according to claim 13 wherein the means for varying the power supplied to the microwave generators is adapted to effect a variation in the microwave generators to which power is supplied.

15. A reactor assembly according to claim 13 wherein one of the plasma reaction chambers is adapted to act as a sensor for the determining of the partial pressure of the said component of the gaseous medium.

16. A reactor assembly according to claim 9 wherein there is included means for monitoring effluent from the plasma reaction chambers and means for varying action of the plasma reaction chambers to maintain partial pressure of a component of the effluent within predetermined limits.

17. A reactor assembly according to claim 16 wherein the means for varying the action of the plasma reaction chambers comprises means for varying power supplied to a microwave generator associated with each plasma reaction chamber.

18. A reactor assembly according to claim 17 wherein the means for varying the power supplied to the microwave generators is adapted to vary equally the power supplied to the microwave generators.

19. A reactor assembly according to claim 17 wherein the means for varying the power supplied to the microwave generators is adapted to effect a variation in the microwave generators to which power is supplied.

20. A reactor assembly according to claim 9 wherein means are included for adding a reagent gaseous medium to said gaseous medium.

21. A reactor assembly according to claim 20 wherein the reagent gaseous medium is added to said gaseous medium prior to its admission to the plasma reaction chambers.

22. A method for plasma enhanced reacting of two or more gases, which method comprising forming a localized plasma by means of microwaves concentrated in a reactor chamber by a field enhancing electrode comprising opposed metal assemblies positioned with a gap therebetween, said gap defining a region in which microwave energy is concentrated so as to localize the plasma therein, at least one of said gases being passed through a passage formed in one of the opposed metal assemblies and communicating with the gap, feeding the other gas or gases into the gap, and extracting effluent gas containing reaction product out through a passage formed in the other of said metal assemblies and communicating with the gap.

23. A method as claimed in claim 22, wherein the metal assemblies are conical in form and arranged to taper towards said gap, the passages therein are axial and of substantially equal diameter, and said other gas or gases being drawn by Venturi effect into the passage in said other of said metal assemblies, said Venturi effect being caused by flow of said at least one of said gases from the passage in said one of the metal assemblies into the passage in said other metal assembly.

24. A method according to claim 22 wherein the passage of one assembly is of smaller diameter than the passage of the other assembly and reactant gas is fed to said smaller diameter axial passage.

25. A method according to claim 22 wherein said at least one of said gases is a gas from which a pollutant is to be removed and said other gas or gases are adapted to be activated by the plasma to provide excited radicals which react with said pollutants.

26. A method according to claim 22 wherein the effluent gas from the reactor chamber is passed through a second chamber containing a material adapted to catalyse further reactions with components of said effluent gas.

* * * * *